Patented Oct. 11, 1938

2,132,607

UNITED STATES PATENT OFFICE 2,132,607

BITUMINOUS EMULSIONS AND METHOD OF PRODUCING SAME

William N. Davis, Orville E. Cushman, and Joseph E. Fratis, Berkeley, Calif., assignors to Standard Oil Company of California, San Francisco, Calif., a corporation of Delaware No Drawing. Application May 28, 1934, Serial No. 727,894

12 Claims. (Cl. 134—1)

This invention relates to slow breaking bitumen-in-water emulsions, suitable for mixing with aggregates and the like, and to methods for preparing the same.

The practice of adding variously chosen materials to the ordinary quick breaking bituminous emulsions of commerce to render them less quick breaking and thus mixable with aggregates, applicable as paints by brushing and for various similar uses is well known. Soaps such as the alkali soaps of the fatty acids, proteins such as casein and gelatine or their alkali compounds, colloidal clays such as bentonite and certain inorganic salts such as trisodium phosphate have all received some consideration in this connection.

All of these materials are, however, to a certain degree primary emulsifiers and are not essentially stabilizers. They therefore appear to impart stability to quick breaking emulsions merely by promoting further emulsification and not by any stabilizing function peculiar to themselves. Whether or not this be the reason it is a fact that in one way or another the slow breaking emulsions prepared through the use of such materials have usually fallen short of the desired perfection. They are either too viscous, too costly, too subject to attack by organisms, too readily re-emulsified or are not sufficiently stable. For instance, few emulsions of this type have ever been produced which could be mixed with aggregates containing high percentages of Portland cement without immediate and substantially complete breakdown.

It is the object of this invention to provide a stabilizer for quick breaking bitumen-in-water emulsions which will possess none of the foregoing defects.

It is another object of this invention to provide a means for producing mixing type emulsions of a wide range of oleaginous materials and of any desired degree of stability or rate of breakdown.

Another object is to provide bituminous emulsions which are non-viscous and free flowing even in concentrated form and which are of extreme stability when mixed with substantial quantities of Portland cement.

A further object is to provide an emulsion stabilizer for use in oil-in-water type emulsions which is readily available at low cost.

A still further object of our invention is to provide an economical use for a considerable quantity of what has hitherto been a waste product of the paper pulp industry.

Still other objects of our invention will be readily apparent to those skilled in the art from the description and discussion which follows.

As is well known, the primary object in the preparation of paper pulp from wood is to decompose the complex and poorly understood combinations of cellulose with a host of associated ingredients and to isolate the cellulose in substantially pure form with but little concern as to what changes are brought about in the associated materials during the process. Several methods have been devised and widely adopted for effecting this primary object though they arrive at the desired end by quite different chemical routes with the result that the bodies with which the cellulose was originally associated are found to emerge from the several processes in very different states of combination and consequently with quite different properties and utility.

For instance in the widely used acid "sulfite" process the lignin or lignone complexes, which constitute a major portion of the non-cellulosic ingredients of wood, emerge as water soluble sulfonic acids and/or sulfonic acid salts and remain in the so-called waste liquor as such. On the other hand, in the alkaline "soda" and "sulfate" processes these same lignin complexes are converted to water soluble salts of what have been loosely termed lignic acids.

Similarly the resin bodies, the hemicelluloses, the sugars, the proteins and the fats of the original wood are quite differently affected by the acid and by the alkaline methods of cellulose liberation so that the waste liquors from these two types of process are quite different in substantially every respect.

It is however not surprising since the primary or main product, cellulose, is substantially the same from the several processes, that but little attention has been paid to the foregoing fundamental differences which exist between the secondary products, and further that "cellulose waste liquors" have frequently if not usually been considered as the same irrespective of the process in which they originated. Little wonder, therefore, that many of the uses that have been proposed for these waste products are vague and indefinite and appear to be, in reality, scarcely more than guesses.

It is further a fact, that appears to have been all too infrequently recognized, that from the same process of decomposition somewhat different waste liquors will result from the treatment of different kinds of woods and even from the same process and the same wood through different specific procedure in individual instances.

The net result is, therefore, that many hazy, confused and even conflicting statements are to be found scattered throughout the literature relative to the properties and hence the potential uses of this or that waste liquor from the wood pulp industry. The literature covering the art of bituminous emulsion manufacture has been beset with a particularly impressive array of such assertions, chief among which is to the effect that the liquors from the acid "sulfite" process either as such or when neutralized or in other modified forms constitute powerful and hence highly desirable primary emulsifiers. The alkaline or "black liquors" from the "soda" and the "sulfate" processes have likewise, though less frequently, been proposed as possessing primary emulsifying powers of a high order.

During an extended study of both the sulfite and the sulfate waste liquors and particularly of their action and the action of their various components in bituminous emulsion systems we have found that while most of the previous disclosures are either wrong or require very considerable interpretation and modification to make them operable there is at least one fact which, so far as we are aware, has not previously been disclosed and which appears to constitute a major contribution to the art of bituminous emulsion manufacture as well as to provide that for which so many workers have previously sought, namely, a useful outlet for one of the waste products of the wood pulp industry.

We have discovered that if the alkaline "black liquor" from the "sulfate" process is properly employed a stabilizer of very great potency for already formed oil-in-water type bituminous emulsions may be produced.

As is well known in the industry, but few methods have hitherto been available for the production of asphaltic emulsions which could be mixed with aggregates carrying useful quantities of finely divided solids and especially of Portland cement without substantially immediate and complete breakdown of the emulsion. The advantages inherent in a concrete containing both Portland cement and a bituminous binder have, therefore, seldom been realized. Especially has this been true when it has been necessary or expedient to employ asphalts derived wholly from petroleum and in the absence of an appreciable amount of added natural asphalt such as that from Trinidad.

Our invention consists broadly in oil-in-water type emulsions of extreme stability, and in a method for their production, with particular emphasis on petroleum asphalt emulsions having a degree of stability or resistance to break down sufficient to permit of thorough mixing with aggregates containing relatively high percentages of Portland cement or other highly subdivided solids, and in a simple and reliable means for producing the same.

Our stable emulsions, contrary to general previous practice, do not derive their stability from large amounts of primary emulsifier added in excess of the amount necessary to initially produce the emulsion and in fact often contain no primary emulsifiers whatever other than those naturally occurring in the asphalt or produced during its manufacture. Since their stability is derived from a particular and specific stabilizer added for that function and that alone, it can be controlled at will without appreciably altering the other characteristics of the emulsions.

In carrying out our invention we first make a quick breaking bituminous emulsion such as described by Montgomerie in U. S. #1,643,675 or by Braun in U. S. #1,737,491. While the temperature of this emulsion is held at 160°–210° F. and preferably at 180°–190° F. we add with constant stirring the desired quantity of sulfate "black liquor", containing roughly 15% solids, followed immediately by a solution of one of several acidic bodies in quantity sufficient to bring the finished composition to substantial neutrality or even to make it slightly acid.

If agitation is interrupted as soon as the black liquor stabilizer and the acidic neutralizer are thoroughly incorporated and the composition is allowed to cool in a substantially quiescent state, preferably in the mixer in which prepared, an emulsion entirely unique in certain of its properties will result.

In the selection of a suitable black liquor or black liquor concentrate for use in this connection it appears to make little difference whether the resin and fatty acid soaps formed by hydrolysis during treatment of the wood have been removed, as is the practice in some mills, or whether the total organic decomposition products remain in the liquor as produced. Similarly it appears, so far as we have yet found, that the particular kind of wood from which the black liquor is derived is of minor importance in determining the stabilizing power of the product.

The quantity of black liquor to be used for imparting greatest stability to an emulsion is, on the other hand, extremely critical. For instance with one liquor which may be considered typical of that produced in the Pacific Northwest we have found that the operable range lies between 3 and 4% of black liquor (15% solids) on the basis of the finished emulsion, which calculated to black liquor solids shows an operable range from 0.45 to 0.60% of the emulsion. Since these solids will contain at least 35% ash it will be seen that the limits of concentration for the actual organic stabilizer will be from about 0.30 to about 0.40% of the emulsion. In one typical instance we found 0.578% total solids to be the optimum amount for use with a 55% asphalt, Braun emulsion.

While in such an obviously delicately balanced system it would of course be impossible to set an exact concentration of stabilizer which could be taken as universal, the operable range is so narrow that it will not be difficult for a skilled operator to determine the amount most suitable for his particular combination of materials and his specific purpose.

In the selection of satisfactory acidic materials for use in our invention we have found a considerable number of inorganic salts giving acidic water solutions and also several weak organic acids to be operable and have usually employed a readily available and inexpensive salt such as alum or a weak, low cost, organic acid such as tannic acid. Whatever the acidic body chosen, it is added in relatively dilute solution sufficient to neutralize the excess alkalinity of the quick breaking emulsion, the residual alkalinity of the black liquor and to bring the aqueous phase as a whole to a pH of 5.5 to 7.0.

While "black liquors" may be used with good results in our process in the form in which they are received from the pulp mills it will sometimes be desirable first to remove as far as possible any resin acid and fatty acid soaps which may be present since if allowed to remain they will use up a certain amount of the acidifier subsequently added and thus increase the amount necessary to reach the desired pH.

Similarly it is not necessary to remove the rather considerable amounts of alkali carbonate usually contained in black liquors but when such is done by acidifying with a cheap mineral acid and then returning the liquor to an alkaline condition before use it will be found that by such procedure the overall cost of stabilizing an emulsion is appreciably reduced and operating difficulties due to the slow liberation of carbon dioxide in the stabilized emulsion are completely eliminated.

The relative values of several materials tested in this connection are clearly set out in the following table of results obtained by applying the so-called "Cement test" as a measure of the emulsion stability:

TABLE

Acidic reagents

| Stability of emulsion to cement test* | | | Emulsion broke before cement test applied |
|---|---|---|---|
| Very stable | Fairly stable | Unstable | |
| Silver nitrate. Zinc chloride. Antimony trichloride. Ferric sulfate. Ferrous sulfate. Aluminum sulfate. Alum. Tannic acid. Pyrogallic acid. Gallic acid. | Resorcinol. | Benzoic acid. Chromic sulfate. Phenol. Lead chloride. | Calcium chloride. Salicylic acid. Xylenol. Acetic acid. Tartaric acid. Oxalic acid. Boric acid. |

* Cement test.—Thoroughly mix 2½ parts of sand and 7½ parts of Portland cement and then mix in 20 parts of emulsion. The stability of the emulsion is judged by its ability to incorporate or absorb the solids without breaking.

In considering these several acidifiers it will be noted that of the organic acids tested all that were found operable contain at least one benzene nucleus carrying at least two hydroxy groups. Since tannic acid proved to be the best such acid it further appears that the larger the number of OH groups on the aromatic nucleus the more effective is the acid in bringing about the stabilizing action of the black liquor. Just why this should be so is, however, not yet apparent.

In an attempt to better understand this rather surprising emulsion stabilizing action of the alkaline black liquors from the sulfate pulp process we have carried out a number of comparative tests in which a liquor from the acid sulfite process was employed. This liquor was tested in its original acid condition, when neutralized and when made slightly alkaline each, both with and without the addition of the more active acidifiers such as alum and tannic acid which had been found so effective in causing the sulfate liquor to exert its stabilizing action. In no case were we successful in causing a sulfite liquor to show the slightest stabilizing action whatever.

In order to throw further light on the action of the waste liquors from these two major pulp processes in bituminous emulsion systems we have tested both in various comparable forms as primary emulsifiers. We have found the sulfite liquors generally to have moderate emulsifying power while the sulfate liquors appear to have no such power whatever.

As a result of these and other tests we have arrived at a theory as to the mechanism by which the action of the sulfate liquors, upon which our invention rests, is brought about. It is our belief that lignic acid complexes are liberated from their water soluble salts which occur in the sulfate process liquors when these liquors are made acid and further that, since all acids or acidic bodies used in this connection do not give emulsion stabilizers, the particular strength of acid and/or the particular molecular form of the acid body is instrumental in causing the liberated lignin complexes to assume a particular colloidal form which is readily and tenaciously adsorbed by the dispersed bitumen particles thus acting as an efficient and permanent stabilizer.

Since we were unable by any means tried to secure a corresponding stabilizing action from a sulfite liquor it would thus appear that we did not succeed in converting the lignone sulfonic acid bodies contained therein into a lignic compound from which lignic acid could be precipitated as appears to be the case with the sulfate "black liquor".

Whether or not this be the correct explanation of our discovery the fact remains that extremely stable emulsions can be prepared through the proper addition of relatively small quantities of black liquor to preformed, quick breaking emulsions.

Our emulsions, so stabilized, possess an entirely unique combination of properties the mere recitation of which will suggest to those skilled in the art a wide variety of desirable uses for which suitable asphaltic emulsions have hitherto seldom if ever been available.

They possess a degree of fluidity which is equal to and in some cases even greater than that of the quick breaking emulsions from which they are produced. This insures easy and complete mixability with aggregates or other desirable fillers and is in sharp contrast to the high viscosity of previous emulsions of equal bitumen content and equal stability.

They carry so little primary emulsifier that once broken they do not re-emulsify as do the slow breaking emulsions prepared through the use of large amounts of primary emulsifiers.

They are mixable with any desired quantity of carbon black, a property possessed by no other emulsion of which we are aware, and are thus useful in the preparation of a high grade of asphaltic paint.

They are neutral or slightly acid, a condition hitherto unknown in emulsions of equal stability, and are thus useful in many combinations in which the customary alkaline emulsion would be entirely unsuited. They may, for this reason, be incorporated with the ordinary vegetable drying oils in the preparation of asphaltic enamels, whereas these oils in an alkaline medium would readily form soaps and hence lose their desired utility.

One final advantage inherent in these emulsions is the very small quantity of widely available materials which it is necessary to employ in addition to the primary constituents in order to secure the full advantages of maximum stability.

While our description and discussion has centered particularly around asphaltic emulsions it is perfectly obvious that our emulsion stabilizer would function in other oleagineous dispersions which are therefore to be considered a part of our invention and within the scope of the appended claims.

Having now fully described our invention and how it may be utilized what we claim is:

1. An oil-in-water type bituminous emulsion normally unstable against breakdown when mixed with 10% of its weight of Portland cement, containing a small proportion of black liquor from the sulfate process of wood pulp manufacture, effective to render the emulsion stable against breakdown when mixed with as much as 10% of its weight of Portland cement.

2. A stabilized mobile emulsion of asphalt in water containing a black liquor from the sulfate pulp process, in amount effective to render a normally quick breaking emulsion stable against breakdown when mixed with as much as 10% of its weight of Portland cement but insufficient to cause the emulsion in which it is present to break before its stabilizing action can become effective.

3. An emulsion of asphalt in water which contains no primary emulsifier other than soaps formed from the asphaltic acids which are inherent in the asphalt, said emulsion containing about 3 to 4% of black liquor from the sulfate pulp process as a stabilizer effective in preventing breakdown when admixed with as much as 10% of its weight of Portland Cement.

4. A stable, slow-breaking, fluid emulsion of asphalt in water comprising a normally quick-breaking emulsion of asphalt in water, stabilized by the presence of a minor proportion of a sulfate process black liquor and an acid reacting polyhydric phenol adapted to coact therewith in preventing breakdown of the emulsion and containing a significant proportion of carbon black.

5. An emulsion of asphalt in water containing substantially only as primary emulsifiers soaps formed from the asphaltic acids inherent in the asphalt, said emulsion comprising a quantity of black liquor from the sulfate pulp process sufficient to provide about 0.3 to 0.4% by weight of the organic stabilizer portion of said black liquor, reckoned with reference to the emulsion, together with an acid reacting polyhydric phenol adapted to cooperate with said black liquor material in stabilizing the emulsion against breakdown when admixed with as much as 10% of its weight of Portland cement.

6. A normally quick breaking emulsion of asphalt in water stabilized by the presence of a quantity of black liquor from the sulfate pulp process containing about 0.3 to 0.4% by weight of the organic stabilizer portion of said black liquor, reckoned with reference to the emulsion, and an acid reacting compound selected from the group consisting of tannic acid, pyrogallic acid, gallic acid, and resorcinol.

7. An emulsion of asphalt in water as in claim 6 wherein the pH of the aqueous phase is from 7.0 to 5.5.

8. A normally quick breaking mobile emulsion of asphalt in water stabilized by the presence of a quantity of black liquor from the sulfate pulp process containing about 0.3 to 0.4% by weight of the organic stabilizer portion of said black liquor, reckoned with reference to the emulsion, and tannic acid to bring the emulsion to a pH of 7.0 to 5.5.

9. In a method of producing a slow breaking mixing type bituminous emulsion, the step of adding to a relatively quick breaking emulsion, normally unstable when mixed with 10% of its weight of Portland cement, a small proportion of a sulfate pulp process black liquor, followed immediately by the step of adding to the admixture an acid reacting polyhydric phenol adapted to coact with the black liquor material in rendering the emulsion stable when mixed with as much as 10% of Portland cement.

10. The method of producing a slow breaking asphaltic emulsion which comprises adding to a relatively quick breaking emulsion a quantity of black liquor from the sulfate pulp process sufficient to provide about 0.3 to 0.4% by weight of the organic stabilizer component of said black liquor followed immediately by an acid reacting substance to bring the pH of the emulsion to 7.0 to 5.5, said acid substance being selected from a group consisting of tannic acid, pyrogallic acid, gallic acid, and resorcinol.

11. The method as in claim 10 wherein the black liquor stabilizer is vigorously stirred into the quick breaking emulsion heated to 160° to 210° F. and the acidic material is added immediately with further agitation.

12. The method of producing a slow breaking mixing type asphaltic emulsion which comprises adding to a relatively quick breaking emulsion a quantity of black liquor from the sulfate pulp process sufficient to provide about 0.3 to 0.4% by weight of the organic stabilizer portion of said black liquor followed by the addition of tannic acid to bring the pH of the emulsion to 7.0 to 5.5.

WILLIAM N. DAVIS.
ORVILLE E. CUSHMAN.
JOSEPH E. FRATIS.